United States Patent [19]
Taguchi et al.

[11] 3,916,858
[45] Nov. 4, 1975

[54] INTAKE AND EXHAUST SYSTEM FOR INTERNAL COMBUSTION ENGINE

[75] Inventors: Eiji Taguchi, Tokyo; Soichi Nakano, Kawagoe; Yoshitoku Iizuka, Toda, all of Japan

[73] Assignee: Honda Giken Kogyo Kabushiki Kaisha, Tokyo, Japan

[22] Filed: May 29, 1973

[21] Appl. No.: 364,543

[30] Foreign Application Priority Data
June 28, 1972 Japan.............................. 47-76211

[52] U.S. Cl.... 123/122 AB; 123/75 B; 123/191 SP; 123/32 SP; 165/52
[51] Int. Cl...................... F02b 19/10; F02b 19/18
[58] Field of Search .. 123/122 A, 122 AA, 122 AB, 123/32 SP, 32 ST, 75 B, 191 S, 191 SP; 165/52

[56] References Cited
UNITED STATES PATENTS

| | | | |
|---|---|---|---|
| 1,342,159 | 6/1920 | Champaign | 123/122 |
| 1,670,550 | 5/1928 | Putnam | 123/122 |
| 1,744,319 | 1/1930 | Link | 123/122 |
| 2,232,413 | 2/1941 | Steskal | 123/122 |
| 2,821,182 | 1/1958 | Kennedy | 123/122 |
| 3,543,736 | 12/1970 | Suzuki | 123/32 ST |
| 3,741,180 | 6/1973 | Eichbaum | 123/122 |
| 3,780,715 | 12/1973 | Flitz | 123/122 |

*Primary Examiner*—Charles J. Myhre
*Assistant Examiner*—Ronald B. Cox
*Attorney, Agent, or Firm*—Lyon & Lyon

[57] ABSTRACT

An intake and exhaust system is provided for internal combustion engines of the type which employ a main combustion chamber and an auxiliary chamber in communication therewith through a torch nozzle; the main chamber having a valve controlled lean mixture inlet and a valve controlled exhaust outlet; the auxiliary chamber having a valve controlled rich mixture inlet and a spark plug; an intake pipe adapted to conduct a rich mixture to the auxiliary chamber and an exhaust pipe adapted to conduct heated exhaust gasses from the main chamber; the pipes having portions sharing a common heat transferring partition wall to provide a region in which heat is transferred from the exhaust pipe to the rich mixture pipe to heat the rich mixture passing therein; the pipes having portions between the heat exchange region and the main and auxiliary chambers which are separated from each other and joined to the engine in a manner to minimize stress due to temperature change; the pipes being encased in a common housing to provide encompassing heat insulation.

2 Claims, 4 Drawing Figures

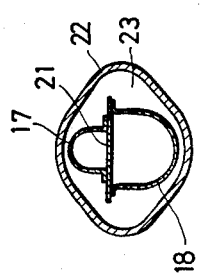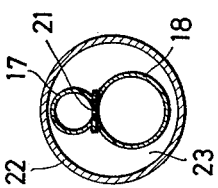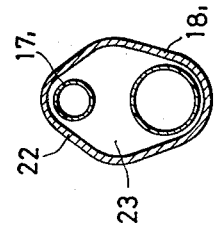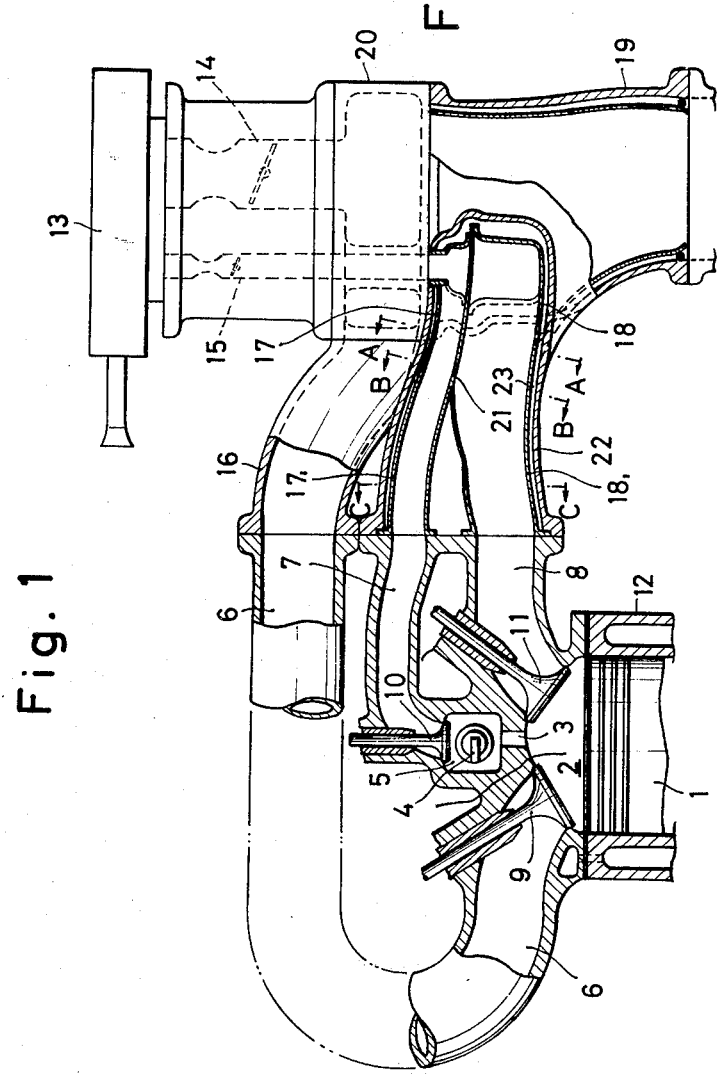

INTAKE AND EXHAUST SYSTEM FOR INTERNAL COMBUSTION ENGINE

BACKGROUND OF THE INVENTION

A successful approach to the design of an internal combustion engine which minimizes air pollution is a type of engine having a main combustion chamber and an auxiliary chamber in communication with the main chamber through a torch nozzle, the main chamber having a valve controlled lean mixture inlet and a valve controlled exhaust outlet; the auxiliary chamber having a valve controlled rich mixture inlet and a spark plug.

It is desirable that the rich mixture be heated prior to entry into the auxiliary chamber so as to vaporize the rich mixture and the proximity of heat source such as an exhaust pipe suggests its use as the available source; however, the fluctuating temperature in the exhaust pipe poses problems.

SUMMARY OF THE INVENTION

The present invention is directed to a system of intake and exhaust pipes so as to provide satisfactory fuel preheating for the type of internal combustion engines utilizing a rich mixture auxiliary chamber, and is summarized in the following objects:

A primary object is to provide an intake-exhaust pipe system which is effective to heat the rich mixture component under cold engine conditions so that complete combustion occurs with minimum delay.

A further object is to provide novel connections between the intake and exhaust pipes and the engine so that pipe deformation due to temperature change will not be injurious to the pipe system or to the engine body and thus insure maximum durability.

A still further object is to provide an engine having excellent starting performance and which is low in harmful emissions in the exhaust gas.

DESCRIPTION OF THE DRAWINGS

FIG. 1 is a fragmentary partial sectional, partial side view of an internal combustion engine incorporating the intake and exhaust pipe system of the present invention.

FIG. 2 is a transverse sectional view through A—A of FIG. 1.

FIG. 3 is a transverse sectional view through B—B of FIG. 1.

FIG. 4 is a transverse sectional view through C—C of FIG. 1.

An internal combustion engine suitable for utilization of the intake and exhaust pipe system of the present invention includes an engine block 12 having a plurality of pistons, each forming one wall of a main combustion chamber 2. Each combustion chamber is connected to an auxiliary or rich mixture chamber 5 through a torch nozzle 3. Each auxiliary chamber contains a spark plug 4.

The main chamber is also provided with an inlet valve 9 which controls a lean mixture passage 6 and an exhaust valve 11 which controls an exhaust passage 8. The auxiliary chamber 5 is provided with a valve 10 which controls a rich mixture passage 7.

Mounted at one side of the engine block 12 is an air cleaner 13 which communicates with a main carburetor 14 and an auxiliary carburetor 15 secured to the riser 20. Disposed below the riser 20 is an exhaust manifold 19 joined to a lateral housing 22, the extremity of which is joined to an engine head containing the passages 7 and 8.

Within the housing 22 is an auxiliary intake pipe 17 connected to the auxiliary carburetor 15 and connected through an extension 17' to the passage 7. Similarly, within the shell 22 is an exhaust pipe 18 communicating with the manifold 19 and having an extension 18' which communicates with the passage 8.

The pipes 17 and 18 share a heat transferring partition wall 21; however the extensions 17' and 18' separate and diverge. The pipes 17 and 18 as well as their extensions are spaced from the walls of the enclosing housing 22 to form a heat insulating space or zone 23.

The main carburetor 14 discharges into a main or lean mixture pipe 16 which communicates with the lean mixture passage 6.

Operation of the internal combustion engine and the intake-exhaust pipe system is as follows:

A charge of a lean air fuel mixture is admitted into the chamber 2 during the intake stroke of the piston 1. In appropriately timed relation a charge of a rich air fuel mixture is received in the auxiliary chamber 5. To initiate the power stroke of the piston 1, the rich air fuel mixture is ignited by the spark plug 4 and the contents of the auxiliary chamber 4 are ignited and injected into the main chamber 2 through the torch nozzle 3.

In the exercise of the present invention, heat from the exhaust pipe is transferred through the partition 21 to heat the incoming rich fuel mixture in the pipe 17. It has been found that within a few cycles of operation, the rich air fuel mixture is vaporized in the auxiliary chamber, resulting in maximum combustion. The partition 21 is formed of metal and is as thin as possible to facilitate rapid heat transfer.

The extensions 17' and 18' diverge so that any distortion due to heating can be readily accommodated without placing undue stress on the extensions or the engine head.

While the space 23 is indicated as empty, it may contain heat insulating material.

While a particular embodiment of this invention has been shown and described, it not intended to limit the same to the details of the construction set forth, but instead, the invention embraces such changes, modifications and equivalents of the various parts and their relationships as come within the purview of the appended claims.

We claim:

1. The combination with an internal combustion engine having a head structure of the type which includes a main combustion chamber and an auxiliary combustion chamber communicating through a torch passage, of an intake and exhaust pipe system comprising: an intake pipe for a rich mixture communicating with the auxiliary chamber, an exhaust pipe communicating with the main chamber, a housing enclosing the intake and exhaust pipes but spaced therefrom, means including a heat transferring partition wall joining said pipes whereby the rich mixture in said intake pipe may be heated by exhaust gases conducted through said exhaust pipe, means attached to the exterior of said housing defining an intake passage communicating with the main chamber, said intake passage having a heat exchange surface whereby a lean mixture for the latter said intake passage may be heated by exhaust gases conducted through said exhaust pipe, a carburetor for delivering a lean mixture at right angles to said heat exchange surface, and a carburetor for delivering a rich mixture at right angles to said heat transferring partition wall.

2. The combination with an internal combustion engine having a head structure of the type which includes a main combustion chamber and an auxiliary chamber communicating through a torch passage, of an intake and exhaust pipe system comprising: an intake pipe for a rich mixture communicating with the auxiliary chamber; an exhaust pipe communicating with the main chamber; a housing enclosing the exhaust pipe but spaced therefrom; means including a heat transferring partition wall joining said pipes whereby the rich mixture in said intake pipe may be heated by exhaust gases conducted through said exhaust pipe; means attached to the exterior of said housing defining an intake passage for a lean mixture communicating with the main chamber; the latter said passage having a heat exchange surface whereby lean mixture for the latter said intake passage may be heated by exhaust gases conducted through said exhaust pipe; a carburetor for delivering a lean mixture at right angles to said heat exchange surface, and a carburetor for delivering rich mixture at right angles to said heat transferring partition wall.

* * * * *